United States Patent
Romandy et al.

(12)
(10) Patent No.: US 6,283,013 B1
(45) Date of Patent: Sep. 4, 2001

(54) TEA STEEPER FOR COFFEEMAKER

(75) Inventors: Mark K. Romandy, Midlothian; Gregory E. Salyers; Dean C. Warner, both of Glen Allen, all of VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 0 days.

(21) Appl. No.: 09/227,566

(22) Filed: Jan. 8, 1999

Related U.S. Application Data

(60) Provisional application No. 60/071,095, filed on Jan. 9, 1998.

(51) Int. Cl.⁷ .................................................. A47J 31/18
(52) U.S. Cl. ................................ 99/322; 99/319; 99/323; 99/323.3
(58) Field of Search .............................. 99/322, 321, 319, 99/318, 317, 323, 323.3; 210/232, 238, 413, 474, 473, 477, 451, 452

(56) References Cited

U.S. PATENT DOCUMENTS

| | | |
|---|---|---|
| 638,698 | 12/1899 | Bourie . |
| 814,460 * | 3/1906 | Kruckewitt ............................... 99/322 |
| 936,997 * | 10/1909 | Grimm .................................... 99/322 |
| 1,012,680 * | 12/1911 | Mayer ..................................... 99/322 |
| 1,357,051 * | 10/1920 | Heinrichs ............................... 99/322 |
| 1,920,268 * | 8/1933 | Moriya ................................ 99/321 X |
| 2,234,397 | 3/1941 | Bentz . |
| 3,631,793 | 1/1972 | Bednartz ................................ 99/295 |
| 4,683,812 | 8/1987 | Tarlow et al. ....................... 99/289 R |
| 4,821,630 | 4/1989 | Roberts .................................. 99/223 |
| 5,453,189 | 9/1995 | Joergensen ........................... 210/238 |

FOREIGN PATENT DOCUMENTS

| | | | |
|---|---|---|---|
| 105282 * | 10/1938 | (AU) ..................................... 99/322 |
| 1196574 | 6/1958 | (FR) ..................................... 99/287 |
| 3719 * | 9/1906 | (GB) ..................................... 99/322 |

* cited by examiner

*Primary Examiner*—Reginald L. Alexander
(74) *Attorney, Agent, or Firm*—Roger S. Dybvig

(57) ABSTRACT

This invention relates to a tea steeper that enables an automatic drip coffeemaker to brew tea as well as coffee. The tea steeper comprises a cylindrical body having perforated side walls, a perforated bottom wall, and an open top surrounded by a support rim. A pair of upwardly extending finger grips are provided to enable one to easily grasp the tea steeper. In use, the support rim rests atop the spout of a carafe for suspending the tea steeper within the carafe. The carafe may also contain a pivotal lid which closes over the spout but does not engage the support rim or finger grip portions of the tea steeper resting atop the spout.

13 Claims, 5 Drawing Sheets

TEA STEEPER FOR COFFEEMAKER

CROSS REFERENCE TO RELATED APPLICATION

This application claims the benefit of copending U.S. Provisional Application No. 60/071,095, filed Jan. 9, 1998.

FIELD OF THE INVENTION

This invention relates to a tea steeper for a coffeemaker, and more particularly, to a reusable filter that enables an automatic drip coffeemaker to brew tea as well as coffee.

INCORPORATION BY REFERENCE

The disclosure of U.S. Pat. No. 4,744,291, issued to Wallin on May 17, 1988, is incorporated herein by reference for its representation of an automatic drip coffeemaker. The disclosure of U.S. Pat. No. 5,224,634, issued to Graham on Jul. 6, 1993, is incorporated herein by reference for its representation of a carafe having an integral handle and spout assembly. The disclosure of U.S. Design Patent No. D378,970, issued to Brady et al. on Apr. 29, 1996, is incorporated herein by reference for its representation of an automatic drip coffeemaker with a carafe having an integral handle and spout assembly with a carafe lid pivoted thereto.

BACKGROUND OF THE INVENTION

Tea is typically brewed by placing tea leaves in a filter which is placed in hot water for a period of time to permit the tea leaves to steep in the hot water.

In a conventional automatic drip coffeemaker, heated water is delivered to a filter basket and infused into coffee grounds in the basket. This produces brewed coffee which drains through an outlet port in the bottom of the filter basket and into a carafe supported beneath the filter basket. Conventional automatic drip coffeemakers may be used to brew tea but usually without uniform results. An automatic drip coffeemaker does not provide a reliable control over the period of time during which the tea leaves are steeped in hot water. One problem is that tea leaves are preferably steeped for a period of time, but the heated water in an automatic drip coffeemaker will often pass too quickly through the tea leaves. Also, tea leaves can clog the drain port of a coffee filter basket in which case the heated incoming water may overflow the filter basket.

There are tea makers which have a reusable filter in a carafe closed by a lid. The filter may be removably suspended from the rim of the carafe body and hot water poured through the filter. These have the advantage that the user can remove the filter when the desired strength of the brewed tea is reached. Of course, they are not suitable for brewing coffee.

SUMMARY OF THE INVENTION

An object of the present invention is to provide a reliable method of brewing or steeping tea using an automatic drip coffeemaker. Another object is to provide a filter that allows a conventional automatic drip coffeemaker to be used to brew tea.

A further object of this invention is to provide a tea filter for an automatic drip coffeemaker that is reliable, simple to use, and inexpensive to manufacture.

A further object of this invention is to provide a tea filter that can be easily and safely inserted and removed from a carafe.

In accordance with this invention, a tea steeper or filter comprises a filter basket which has a support rim at its upper end by which the filter may be supported by the spout of a carafe with the filter basket suspended into the carafe. In addition, the upper rim of the filter is formed with upstanding finger grip surfaces so that the filter can be easily and safely inserted into and removed from the carafe.

Further in accordance with this invention, the projection of the tea filter above the portion of the carafe rim on which it is supported is sufficiently short that the filter can be supported by the spout of an automatic drip coffeemaker carafe without interfering with the closing of the lid of the carafe. Accordingly, an automatic drip coffeemaker can be converted to a tea maker by, after filling the cold water reservoir of the coffeemaker with sufficient water for the brewing process, simply inserting the filter of this invention into the coffeemaker carafe, placing tea leaves in the filter, closing the lid of the carafe, and placing the carafe on the warmer plate beneath the filter basket of the coffeemaker. The coffeemaker is then turned on and operates in its normal fashion to deliver hot water to the filter basket above the carafe. The hot water will flow down through the filter basket, through the usual opening in the lid of the carafe, into the filter suspended in the carafe and ultimately into the surrounding volume of the carafe. When the desired strength of the brewed tea is obtained, the user can simply remove the carafe from the warmer plate and remove the filter from the carafe.

Other objects and advantages of this invention will become apparent from the following description and accompanying drawings.

DETAILED DESCRIPTION

Figure 1:
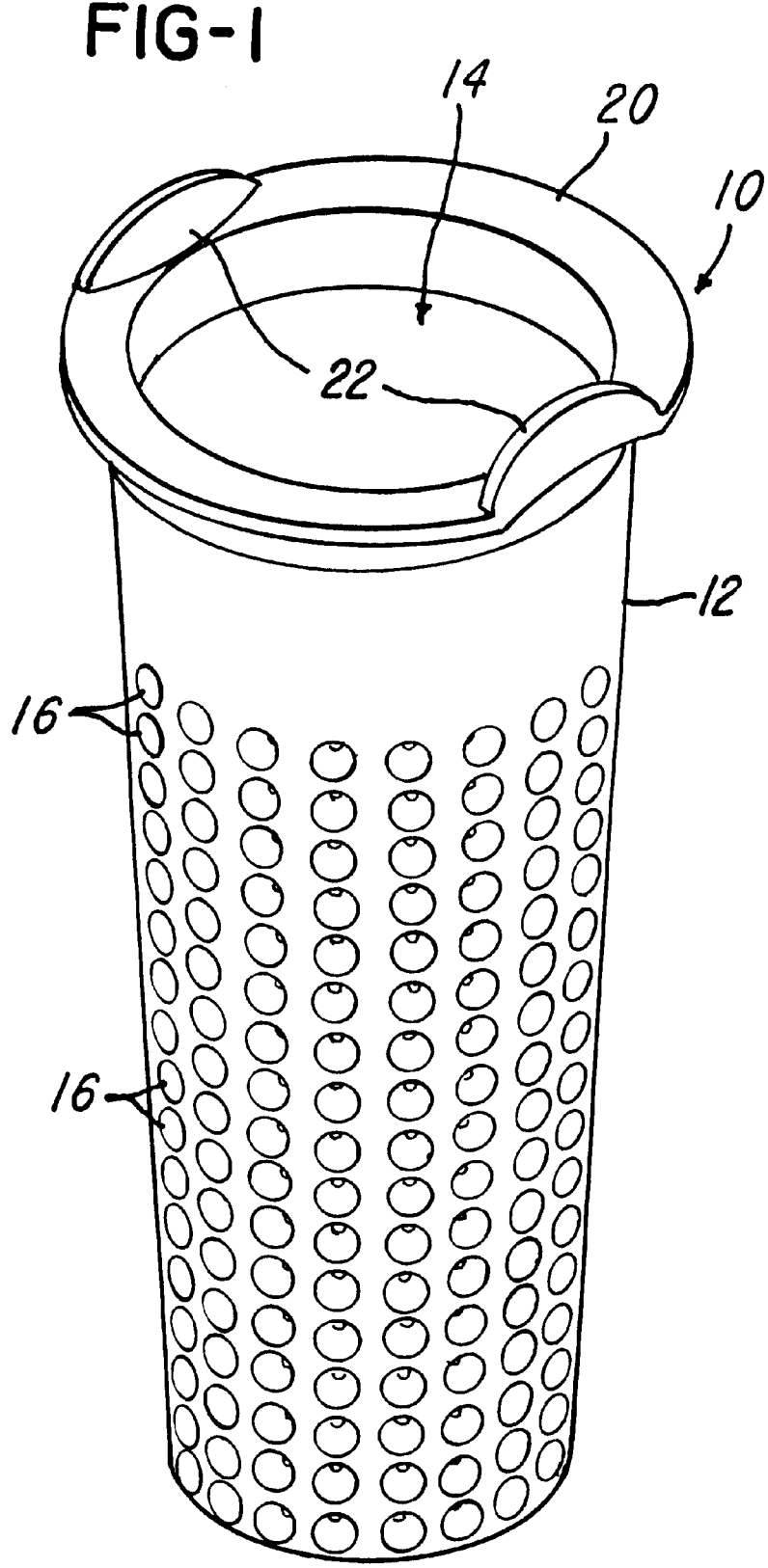
FIG. 1 is a perspective view of a tea steeper or filter according to the present invention.

FIG. 1 shows a tea steeper or filter 10 of this invention which comprises a one-piece molded plastic cylindrical body 12 having an open top 14 and which has plural perforations 16 along its side and bottom walls that forms a basket for tea leaves. The open top 14 is surrounded by an annular support rim 20 that has diametrically opposed, arcuately outwardly concave upstanding finger grip portions 22 which enable a user to grasp the top of the filter 10 and insert it into, or remove it from, a carafe, such as the carafe 30 of FIG. 2, without touching hot surfaces of the carafe.

Figure 2:
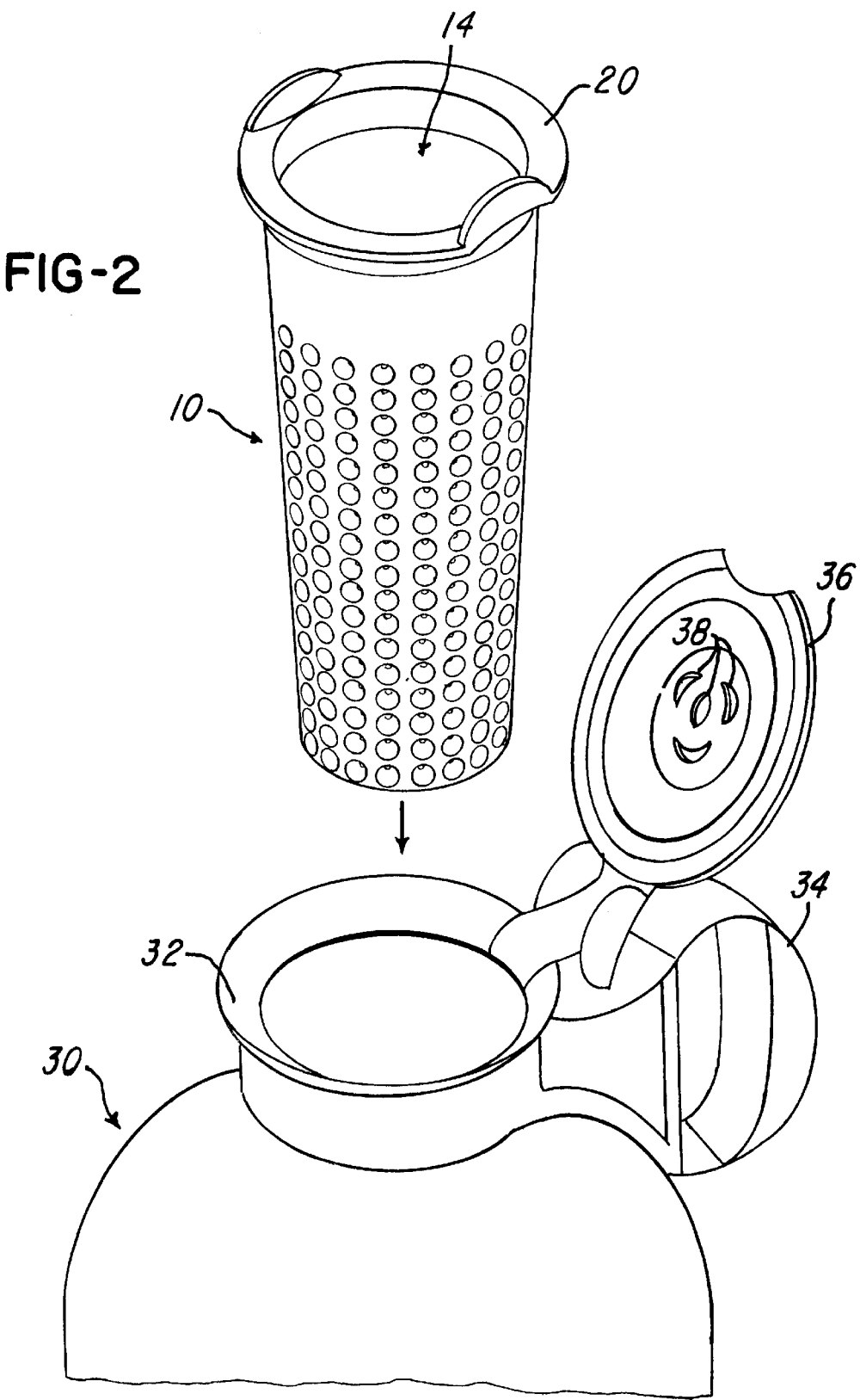
FIG. 2 is a fragmentary perspective view of the tea filter of FIG. 1 and a carafe, showing the filter in position to be inserted into the carafe.

FIG. 2 shows the tea filter 10 in its relative position to the carafe 30 before insertion into the carafe 30. The spout, designated 32, of the carafe 30 has substantially the same inside diameter as the outside diameter of the upper portion of the filter 10 immediately below the annular support rim 20, so that the filter 10 will be snugly received by the carafe 30. The spout 32 is preferably part of an integral assembly which includes the carafe handle 34, which could be mounted on the carafe body in the manner shown in the aforementioned Graham U.S Pat. No. 5,224,634, which assembly also includes a pivoted lid 36, such as shown in the aforementioned Brady Design Patent No. D378,970. The lid 36 has openings 38 therethrough through which hot water can flow from the filter basket of a coffeemaker, such as the coffeemaker shown in the Brady et al. design patent or in the aforementioned Wallin U.S. Pat. No. 4,744,291.

Figure 3:
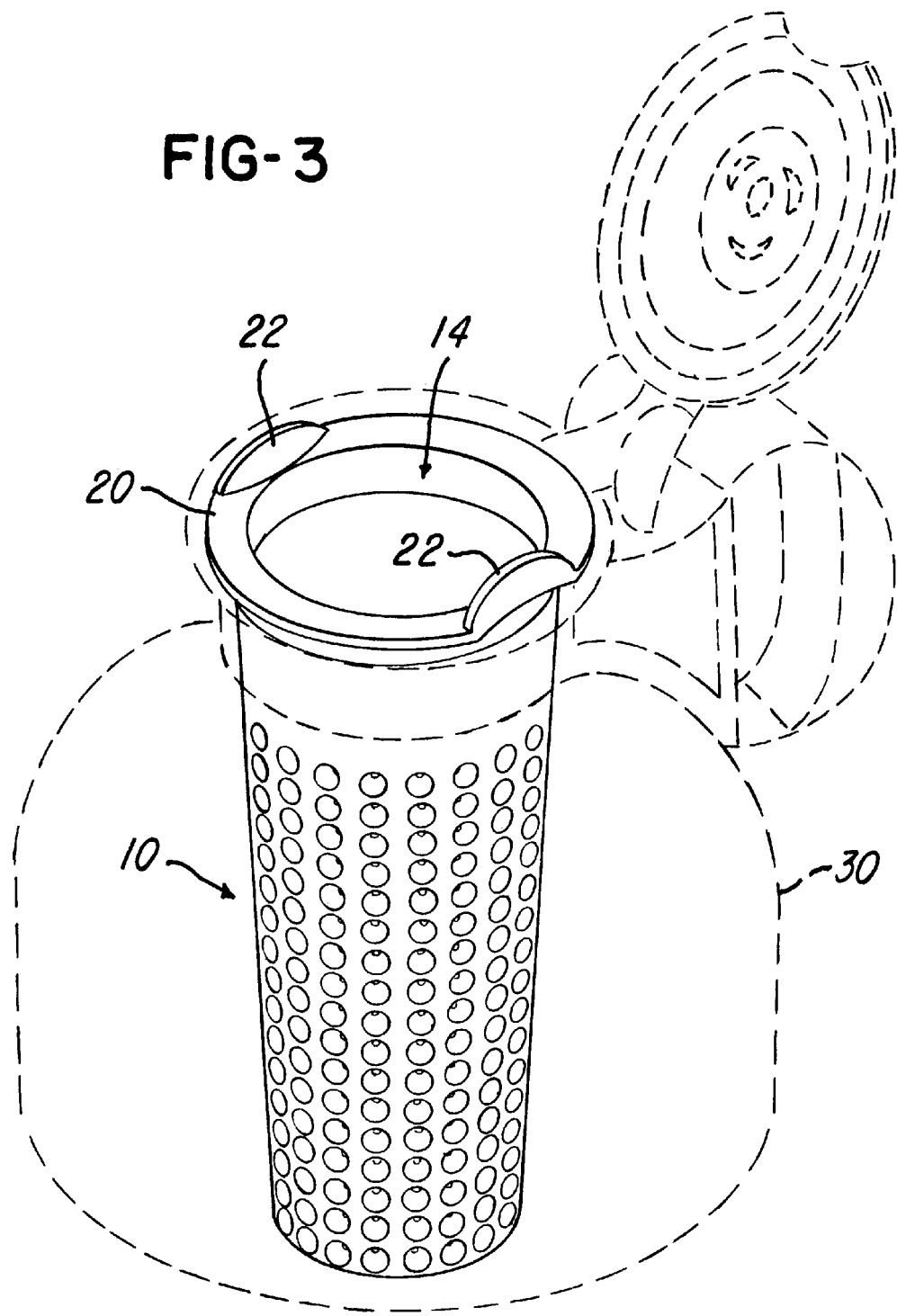
FIG. 3 is a perspective view showing the tea filter suspended in the carafe, the carafe being shown by broken lines in FIG. 3.

With reference to FIG. 3, the support rim 20 in use rests on the spout 32. The finger grip portions 22 are large enough to be easily grasped but sufficiently short that the carafe lid 36 can be closed over the top of the spout 32. Preferably, the bottom of the filter 10 is slightly above the bottom of the carafe 30 so that water can pass through the bottom of the filter 10.

For ease of molding, the perforations 16 are preferably conical with their wider ends on the outside surface of the filter 10.

The mode of operation of the filter and the coffeemaker is as follows. Tea leaves are received through the open upper end 14 of the filter 10. The filter 10 is then grasped by the finger grip portions 22 and inserted into the opening in the center of the spout 32. The carafe lid 36 closes over, but does not engage, the support rim 20 and the finger grip portions 22. The carafe 30 is then placed on the warmer plate of the coffeemaker (not shown), and the coffeemaker turned on to start a brew cycle. Heated water from the coffeemaker pours down and through the opening of the carafe lid 36 and down and through the filter 10. The heated water thus makes contact with the tea leaves in the filter 10 which become saturated and infuse tea particulate creating a brew. The brew enters the carafe 30 through the perforations or filter openings 16, which are large enough so as to let the heated water and brew pass through into the carafe body, but small enough so as not to allow the tea leaves to pass into the carafe body.

When the brew cycle is finished, the filter 10 can be left in the carafe 30 to further promote the infusion and brewing of the tea to the desired concentration. When the infusion process is completed, the carafe 30 can be removed from the coffeemaker, and the lid 36 opened, to allow removal of the filter 10.

The used contents of the filter 10 can be discarded and the filter 10 cleaned and reused.

As is evident, the plastic material from which the filter 10 is made should not promote substantial heat conduction so as to allow a person to grasp the finger grips 22 and remove the tea filter 10 without discomfort. A polycarbonate or SAN would be acceptable.

Figure 4:
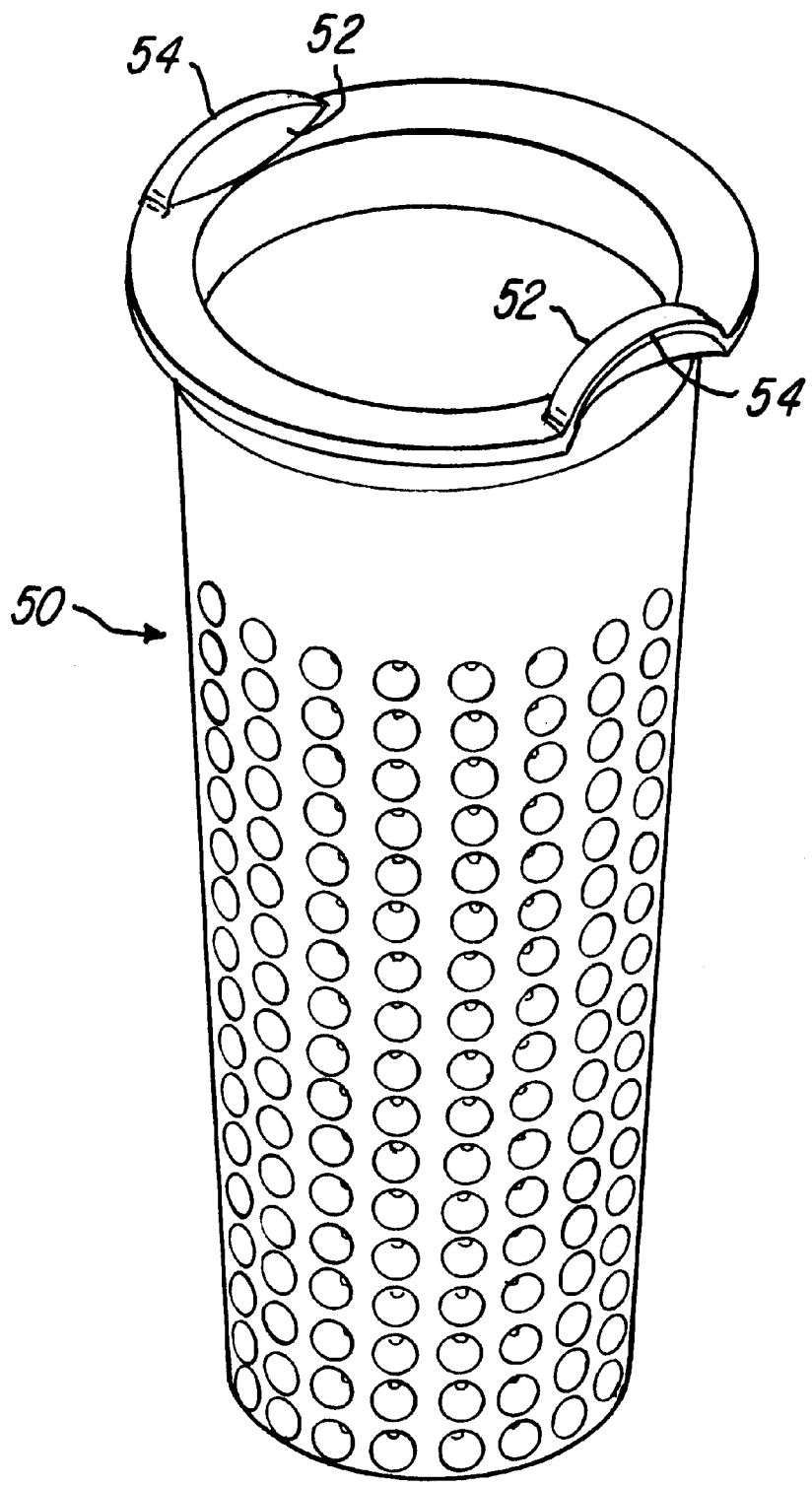
FIG. 4 is a perspective view of second embodiment of a tea filter in accordance with this invention.
Figure 5:
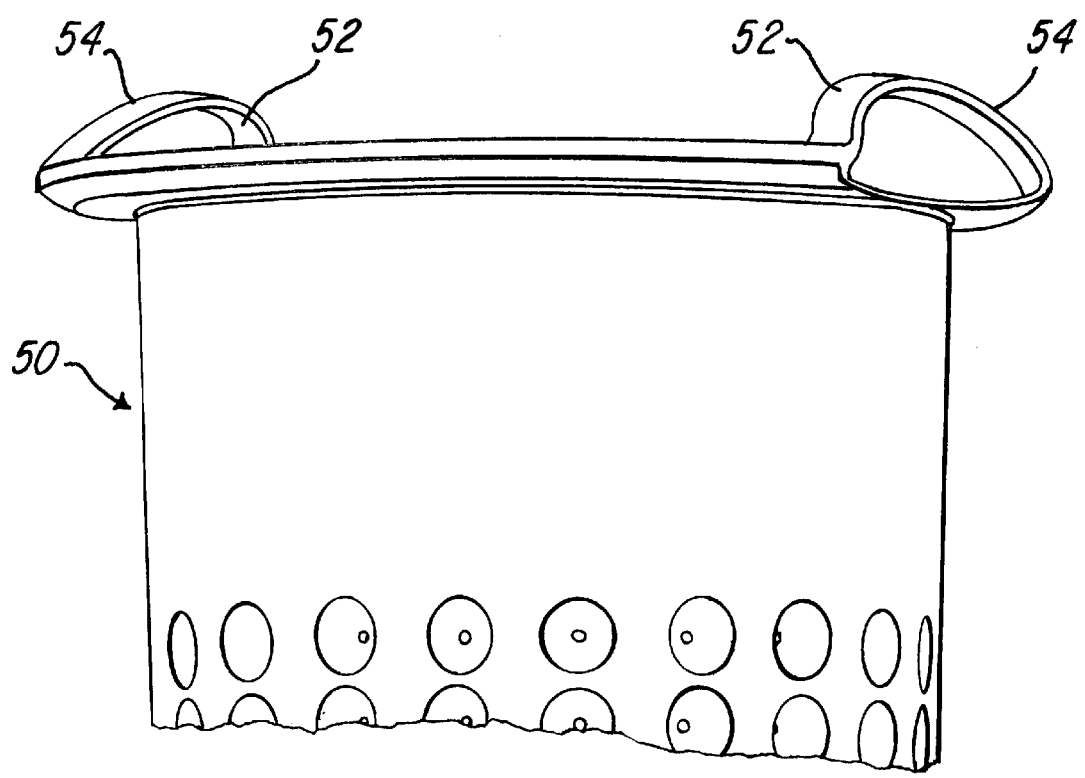
FIG. 5 is a fragmentary perspective view of the tea filter of FIG. 4.

FIGS. 4 and 5 show a second embodiment of a tea steeper or filter, generally designated 50, which has finger grip portions 52 provided with outwardly extending flanges 54 that facilitate holding onto the filter.

Although the presently preferred embodiments of this invention have been described, it will be understood that within the purview of the invention various changes may be made within the scope of the following claims.

Having thus described our invention, we claim:

1. A one-piece tea steeper comprising:
a body having a side wall, a bottom wall, and an open top;
said body having plural perforations;
said body having a support rim mounted to and surrounding said side wall; and
said support rim having a pair of finger grips that project upwardly from said side wall.

2. The tea steeper of claim 1 wherein said finger grips project upwardly from diametrically opposed sides of said side wall.

3. A one-piece tea steeper comprising:
a body having a side wall, a bottom wall, and an open top;
said body having plural perforations;
said body having a support rim mounted to and surrounding said side wall; and
said support rim having a pair of finger grips that project upwardly from diametrically opposed sides of said side wall;
wherein each of said finger grips extends along said rim and has opposite ends spaced apart along said rim and wherein each of said finger grips is arcuately, outwardly concave along its said length between said opposite ends so that the midportion of each of said finger grips is closer to the center of said cylindrical body than the end portions thereof.

4. A tea steeper comprising:
a one-piece body having a side wall, a bottom wall, and an open top;
said body having plural perforations;
said body having a support rim mounted to and surrounding said side wall; and
said support rim having a pair of finger grips that project upwardly from diametrically opposed sides of said side wall, each of said finger grips being arcuately, outwardly concave along its length, said arcuately, outwardly concave finger grips being provided with outwardly extending flanges.

5. The combination of a carafe and a tea steeper comprising:
a carafe having a spout, said spout having an inside diameter;
a one-piece tea steeper comprising:
a cylindrical body having a side wall, a bottom wall, and an open top, said cylindrical body having an outside diameter;
said body having plural perforations;
said tea steeper having a support rim mounted to said cylindrical body surrounding said open top;
said support rim having a pair of finger grips that project upwardly from said side wall;
said cylindrical body adapted to be inserted into said carafe through said spout, said spout having substantially the same inside diameter as the outside diameter of the cylindrical body immediately below said support rim so that said cylindrical body is snugly received within said spout; and
said support rim capable of resting atop said spout.

6. The combination of claim 5 wherein said carafe further comprises a lid adapted to cover said spout, said lid pivotally mounted to said carafe, said lid covering said spout without engaging said support rim or said finger grip portions of said tea steeper therein.

7. The combination of claim 5 wherein said finger grips project upwardly from diametrically opposed sides of said side wall.

8. The combination of a carafe and a tea steeper comprising:
a carafe having a spout, said spout having an inside diameter;
a one-piece tea steeper comprising:
a cylindrical body having a side wall, a bottom wall, and an open top, said cylindrical body having an outside diameter;

said body having plural perforations;
said tea steeper having a support rim mounted to said cylindrical body surrounding said open top;
said support rim having a pair of finger grips that project upwardly from diametrically opposed sides of said side wall;
said cylindrical body adapted to be inserted into said carafe through said spout, said spout having substantially the same inside diameter as the outside diameter of the cylindrical body immediately below said support rim so that said cylindrical body is snugly received within said spout; and
said support rim capable of resting atop said spout;
said finger grips project upwardly from diametrically opposed sides of said side wall
wherein each of said finger grips extends along said rim and has opposite ends spaced apart along said rim and wherein each of said finger grips is arcuately, outwardly concave along its said length between said opposite ends so that the midportion of each of said finger grips is closer to the center of said cylindrical body than the end portions thereof.

9. The combination of a carafe and a tea steeper comprising:
a carafe having a spout, said spout having an inside diameter;
a tea steeper comprising:
a one-piece cylindrical body having a side wall, a bottom wall, and an open top, said cylindrical body having an outside diameter;
said body having plural perforations;
said tea steeper having a support rim mounted to said cylindrical body surrounding said open top;
said support rim having a pair of finger grips that project upwardly from diametrically opposed sides of said side wall, each of said finger grips being arcuately, outwardly concave along its length and provided with outwardly extending flanges;
said cylindrical body adapted to be inserted into said carafe through said spout, said spout having substantially the same inside diameter as the outside diameter of the cylindrical body immediately below said support rim so that said cylindrical body is snugly received within said spout; and
said support rim capable of resting atop said spout.

10. The combination of a carafe and a tea steeper comprising;
a carafe having a spout, said spout having an inside diameter;
a tea steeper comprising:
a one-piece cylindrical body having a side wall, a bottom wall, and an open top, said cylindrical body having an outside diameter;
said body having plural perforations;
said tea steeper having a support rim mounted to said cylindrical body surrounding said open top;
said support rim having a pair of finger grips that project upwardly from said side wall;
said cylindrical body adapted to be inserted into said carafe through said spout, said spout having substantially the same inside diameter as the outside diameter of the cylindrical body immediately below said support rim so that said cylindrical body is snugly received within said spout; and
said support rim capable of resting atop said spout;
said carafe further comprising a lid adapted to cover said spout, said lid pivotally mounted to said carafe, said lid covering said spout without engaging said support rim or said finger grip portions of said tea steeper therein and said lid having an opening through which hot water can be directed from a coffee maker into said tea steeper.

11. A tea steeper comprising:
a body having a side wall, a bottom wall, and an open top;
said body having plural perforations;
a support rim mounted to and surrounding said side wall; and
a pair of arcuately, outwardly concave finger grips projecting upwardly from diametrically opposed sides of said side wall, said finger grips having outwardly extending flanges.

12. The combination of a carafe and a tea steeper comprising:
a carafe having a spout, said spout having an inside diameter;
a tea steeper comprising:
a one-piece cylindrical body having a side wall, a bottom wall, and an open top, said cylindrical body having an outside diameter;
said body having plural perforations;
a support rim mounted to said cylindrical body surrounding said open top;
a pair of arcuately, outwardly concave finger grips projecting upwardly from diametrically opposed sides of said side wall, said finger grips having outwardly extending flanges;
said support rim capable of resting atop said spout.

13. The combination of claim 12 wherein said carafe further comprises a lid adapted to cover said spout and said lid has an opening through which hot water can be directed from a coffee maker into said tea steeper.

* * * * *